US012567208B2

(12) United States Patent
Chen et al.

(10) Patent No.: US 12,567,208 B2
(45) Date of Patent: Mar. 3, 2026

(54) METHOD, APPARATUS, AND STORAGE MEDIUM FOR THREE-DIMENSIONAL RECONSTRUCTION OF BUILDINGS BASED ON MISSING POINT CLOUD DATA

(71) Applicant: WUHAN UNIVERSITY, Hubei (CN)

(72) Inventors: Jiangping Chen, Hubei (CN); Bohua Wang, Hubei (CN); Bin Zhang, Hubei (CN); Zizhu Liang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 220 days.

(21) Appl. No.: 18/423,263

(22) Filed: Jan. 25, 2024

(65) Prior Publication Data

US 2024/0257462 A1     Aug. 1, 2024

(30) Foreign Application Priority Data

Jan. 31, 2023    (CN) .......................... 202310046928.2

(51) Int. Cl.
| | |
|---|---|
| *G06T 17/20* | (2006.01) |
| *G06T 5/70* | (2024.01) |
| *G06T 7/00* | (2017.01) |
| *G06T 7/11* | (2017.01) |
| *G06T 7/187* | (2017.01) |
| *G06T 7/60* | (2017.01) |
| *G06T 15/20* | (2011.01) |

(52) U.S. Cl.
CPC ............... *G06T 17/20* (2013.01); *G06T 5/70* (2024.01); *G06T 7/0002* (2013.01); *G06T 7/11* (2017.01); *G06T 7/187* (2017.01); *G06T 7/60* (2013.01); *G06T 15/205* (2013.01); *G06T 2207/10028* (2013.01); *G06T 2207/20084* (2013.01); *G06T 2207/30184* (2013.01); *G06T 2207/30244* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2019/0088004 A1* | 3/2019 | Lucas | ..................... | G06T 19/20 |
| 2019/0378330 A1* | 12/2019 | Sun | .......................... | G06T 17/10 |
| 2021/0150805 A1* | 5/2021 | Stekovic | ................... | G06T 3/10 |
| 2021/0407188 A1* | 12/2021 | Mundy | ................... | G06T 17/05 |
| 2023/0027234 A1* | 1/2023 | Wu | .......................... | G06T 7/194 |
| 2024/0119671 A1* | 4/2024 | Liu | ........................... | G06T 7/60 |

* cited by examiner

*Primary Examiner* — James A Thompson
(74) *Attorney, Agent, or Firm* — JCIP GLOBAL INC.

(57) ABSTRACT

The invention provides a method, apparatus, and storage medium for reconstructing three-dimensional models of buildings based on missing point cloud data. The method includes integrating image-based point cloud generation, neural network techniques, and skeleton line extraction methods, offering a novel approach to handling missing point cloud data. The generation of point cloud data is achieved using principles of Structure from Motion based on video or panoramic image data. The point cloud is sampled and segmented using a region growing algorithm. A neural network based on PointNet is constructed, utilizing cross-entropy loss functions to assess the missing points in the point cloud. For mapping high-confidence point clouds from sampled points, Truth Points is employed to complete the entire process of real-world three-dimensional reconstruction. The integration of images into the three-dimensional scene is achieved with strict geometric relationships.

17 Claims, 5 Drawing Sheets

1

METHOD, APPARATUS, AND STORAGE MEDIUM FOR THREE-DIMENSIONAL RECONSTRUCTION OF BUILDINGS BASED ON MISSING POINT CLOUD DATA

CROSS-REFERENCE TO RELATED APPLICATION

This application claims the priority benefit of China application serial no. 202310046928.2, filed on Jan. 31, 2023. The entirety of the above-mentioned patent application is hereby incorporated by reference herein and made a part of this specification.

TECHNICAL FIELD

The present invention relates to the field of real-world three-dimensional reconstruction, and proposes an improved method for handling missing point cloud data. Real-world three-dimensional reconstruction involves the construction and fusion of panoramic images and scene three-dimensional models to establish a three-dimensional model of a building. The images are integrated into the three-dimensional scene according to strict geometric relationships. During this process, the point cloud data used may have missing elements, necessitating the localization and completion of the missing data before utilization.

BACKGROUND

The technology of reconstructing three-dimensional models of buildings using point cloud data enables real-time measurable three-dimensional modeling of buildings based on obtained three-dimensional images. This allows for viewing the entire structure from different angles and spaces, providing accurate data on the building. Such technology holds high practical and commercial value.

In the process of handling point cloud data, it is crucial to consider the following characteristics of point cloud data:

1. The Disorder of Point Clouds: Point clouds exhibit disorderliness. Due to the influence of collection devices and coordinate systems, the arrangement of three-dimensional points varies significantly when scanning the same object using different devices or positions. This makes it challenging to process such data directly through End2End models.

2. Sparsity of Point Clouds: Point clouds are sparse, particularly in scenarios involving robotics and autonomous driving where the sampling points from LiDAR cover only a small percentage of the scene's scale. In datasets like KITTI, when projecting the original LiDAR point cloud onto the corresponding color image, only about 3% of pixels have corresponding LiDAR points. This extreme sparsity makes high-level semantic perception based on point clouds particularly difficult.

3. Limited Information in Point Clouds: Point cloud data structure consists of a set of points' coordinates in three-dimensional space, fundamentally representing a low-resolution resampling of the three-dimensional world's geometric shapes. Therefore, point clouds can only provide partial geometric information.

Considering the potential existence of missing data in point cloud data before establishing a three-dimensional model, we propose three methods for addressing missing point cloud data: the domain judgment method, the establishment of a database for simulated repairs, and the neural network method.

SUMMARY

This invention provides a method, apparatus, and storage medium for reconstructing three-dimensional models of buildings based on missing point cloud data. It addresses the issue of data loss caused by point cloud data collection during the construction of three-dimensional models of buildings. The invention enables rapid construction of realistic three-dimensional models of buildings and sophisticated three-dimensional visualization processing.

To achieve the above objectives, the method and technical process for reconstructing three-dimensional models of buildings based on missing point cloud data involve the following steps:

Step 1: Obtain panoramic data of the building through user uploads or mobile phone capture.

Step 2: Generate a three-dimensional point cloud of the building using the panoramic data.

Step 2.1: Establish a 360-degree sequence of panoramic image sets using panoramic data.

Step 2.2: Correct the multiple-view projections of 360-degree panoramic images to obtain sequential multi-view images.

Step 2.3: Perform dense matching and Structure-from-Motion (SFM) reconstruction on the obtained sequential multi-view images to generate a three-dimensional sparse point cloud.

Step 2.4: Utilize PatchMatch Stereo (PMVS) to generate a dense three-dimensional point cloud based on the three-dimensional sparse point cloud.

Step 3: Assess the missing points in the three-dimensional point cloud of the building.

Step 3.1: Smooth the point cloud using surface fitting to reduce model deformation.

Step 3.2: Utilize region growing algorithm for uniform sampling and segmentation of the point cloud.

Step 3.3: Use the partitioned point cloud as input parameters to construct an encoding-decoding neural network. Calculate the missing point results using the trained parameters.

Step 4: Complete the missing parts of the planar point cloud.

Step 4.1: Train and test deep learning completion algorithms using the ShapeNet dataset. Segment the planar point cloud obtained from panoramic images.

Step 4.2: Align and replicate the input image with the corresponding viewpoint in the ShapeNet dataset, creating mappings for each input image with respect to the corresponding image in the dataset.

Step 4.3: Set a maximum threshold, select the dataset images below the threshold with the optimal effect, and construct a planar point cloud based on these images to complete the missing parts of the point cloud.

Step 4.4: Validate the completion effect by constructing a mathematical model through the connectivity relationships of the point cloud, extracting its texture framework structure, and comparing it with the skeleton structure of the input image to ensure the rationality of the completion.

Step 5: Integration of panoramic view, planar image, and three-dimensional model for realistic terminal visualization of the building scene.

Step 5.1: Use the bundle adjustment method to calculate the coordinates of the photographic center and project it onto the horizontal plane. Set labels at the projection point locations.

Step 5.2: Referencing the photographic center point and corresponding label positions, unify the building's panoramic view, planar image, and three-dimensional model in the same coordinate system.

A method for reconstructing a three-dimensional model of a building based on missing point cloud data, characterized by the following steps:

Acquiring 360-degree panoramic data of the building and preprocessing the data to obtain a sequence of multi-view images.

Matching and reconstructing the sequence of multi-view images to generate a three-dimensional sparse point cloud.

Segmenting the three-dimensional sparse point cloud, applying an encoding-decoding neural network to assess the point cloud's missing data in each segment, and completing the missing point cloud for each segment based on the assessment results to reconstruct the three-dimensional model.

In the above-mentioned method:

Acquiring 360-degree panoramic data of the building and creating a sequence of 360-degree panoramic image sets.

Performing multi-view projection correction on the sequence of 360-degree panoramic image sets to obtain corrected multi-view images.

Conducting dense matching and Structure from Motion (SFM) reconstruction on the corrected sequence of multi-view images to generate a three-dimensional sparse point cloud.

Utilizing PatchMatch Stereo (PMVS) to generate a dense three-dimensional point cloud, smoothing the point cloud, and employing a region growing algorithm for uniform sampling and segmentation, resulting in a partitioned dense three-dimensional point cloud.

In the above-mentioned method,

Constructing an encoding-decoding neural network, where the encoder is utilized to extract point cloud feature vectors, and the decoder is utilized to compute missingness outcomes;

Employing a pre-trained neural network to evaluate the missing data in the partitioned point cloud as input parameters, resulting in a determination of point cloud missingness;

Using the sampled points on the surface of the input image and three-dimensional model grid as feature matching points, replicating and aligning the images corresponding to the viewpoints in the ShapeNet dataset, constructing mappings for each input image with the respective images in the dataset;

Establishing a maximum threshold, selecting images from the dataset below the threshold that yield optimal effects, and constructing a planar point cloud based on these dataset images, thereby achieving completion of the missing plane in the point cloud data.

In the above-mentioned method,

Utilizing the bundle adjustment method to solve for the coordinates of the photographic center and projecting the photographic center onto the horizontal plane, setting labels at the projected point positions.

Using the photographic center point and corresponding label positions as references to unify the house panoramic view, floor plan, and three-dimensional model in the same coordinate system.

In the above-mentioned method,

The 360-degree panoramic data of the building is obtained through user uploads or mobile phone capture, and the building's panoramic data includes panoramic images or video streams. In the above-mentioned method, During the multi-view projection correction of the 360-degree panoramic images, an equal-rectangular projection spherical panorama model is employed.

Converting the original input 360-degree panoramic images to three-dimensional panoramic spherical space, with the formula:

$$\begin{cases} x^q_{pano} = w \cdot \theta_q/2\pi + (w/2 - 1) \\ y^q_{pano} = (h/2 - 1) - h \cdot \phi_q/\pi \end{cases}, (-\pi < \theta \le \pi, -\pi/2 < \phi \le \pi/2)$$

$$\begin{cases} \theta_q = (2\pi \cdot x^q_{pano} + 2\pi)/w - \pi \\ \phi_q = \pi/2 - (\pi - 2\pi \cdot y^q_{pano})/2h \end{cases}, (0 \le x^q_{pano} < w, 0 \le y^q_{pano} < h)$$

Where $x_{pano}$ represents the coordinates of the image points in the original panoramic image, $y_{pano}$ represents the corresponding point in the three-dimensional panoramic sphere, w is the length, h is the width of the original panoramic image, and $\theta$ and $\varphi$ represent the horizontal and vertical rotation angles between the spherical space azimuth and the image capture azimuth.

In the above-mentioned method, SFM reconstruction to generate 3D sparse point cloud includes:

Selecting not less than 6 images in the horizontal direction and not less than 2 images in the vertical direction to form a sequence of multi-view images for the building.

Constructing a Gaussian feature pyramid using the sequence of multi-view images for the building and extracting feature points using the SIFT feature operator.

Employing image matching with support line projection and affine-invariant constraints to obtain a set of image matching points.

Recovering the camera poses for panoramic images and reconstructing three-dimensional sparse point clouds using multi-view images.

In the above-mentioned method, utilizing a region growing algorithm to uniformly sample and segment the point cloud blocks obtained after surface fitting.

In the above-mentioned method, the encoding-decoding neural network is based on the BuildNet neural network, which includes:

The encoder extracts point cloud feature vectors from segmented sequence point clouds. Each unit of the encoder uses the PointNet network for initial processing to extract local feature vectors.

The decoder assesses point cloud missing data, which takes the extracted feature vector as input, performs average pooling and Sigmoid activation on the decoded 1024*27 feature matrix, outputs the missing data judgment of the point cloud block, and updates weights through backward propagation using the loss function, with the formula:

$$\text{Sigmoid: } g(z) = \frac{1}{1 + e^z}$$

Loss Function: Cross-entropy is employed to compare predicted results with actual results, calculating the loss value. The gradient descent method is then utilized for backpropagation, adjusting parameter values to achieve optimal results.

Loss function: $J(w, b) = \frac{1}{m}\sum_{i=1}^{m}\left(-y^{(i)}\log\hat{y}^{i} - \left(1 - y^{(i)}\right)\log\left(1 - \hat{y}^{i}\right)\right)$ In the above-mentioned method, when constructing the mapping, feature point matching is performed, specifically:

Using the sampled points on the surface of the input image and three-dimensional model grid as inputs.

Through feature point matching, replicating and aligning the images corresponding to the viewpoints in the ShapeNet dataset.

Mapping the shape and skeleton of the input point cloud plane to the images in the dataset one by one.

Selecting data from the mappings that satisfy the mapping accuracy threshold, and completing the structure of the point cloud with the highest mapping matching degree.

In the above-mentioned method, when using the partitioned point cloud as input parameters, the segmented point cloud blocks are taken as input in a sequential manner.

Relevant calculations are performed on adjacent point clouds, and specifically, the continuity of the point cloud blocks must be ensured during feature extraction by the encoder.

Uniformly sample the input point cloud and grid the point cloud set into blocks with a structure of 3*3*3.

Sequentially inputting the block point clouds into the encoder structure to ensure overall connectivity between the input point cloud block of the previous unit and the input point cloud block of the next unit.

In the above-mentioned method, each unit of the encoder employs the PointNet network for the initial processing of the input point cloud to extract local feature vectors. The decoder constructs a dual-layer network and performs operations on the decoded 1024*27 feature matrix. In the above-mentioned method, based on the input sampled points as feature matching points, replication and alignment are performed with images corresponding to viewpoints in the ShapeNet dataset. Optimal matching results satisfying a threshold are selected, and they are utilized for the completion of the missing point cloud.

In the above-mentioned method, validate the completion effect by constructing a mathematical model through the connectivity relationships of the point cloud, extracting its texture framework structure, and comparing it with the skeleton structure of the input image to ensure the rationality of the completion.

In the above-mentioned method, constructing the final room three-dimensional model and unifying the house panoramic view, floor plan, and three-dimensional model in the same coordinate system, which includes:

Obtaining elevation information for the floor and ceiling of each room.

Identifying the elevation values corresponding to the floor and ceiling by analyzing the histogram of point cloud numbers.

Triangulating polygons for the ceiling, walls, and floor of each room using the Delaunay triangulation method.

Constructing the final room three-dimensional model and outputting it in vector mesh grid form.

Unifying the house panoramic view, floor plan, and three-dimensional model in the same coordinate system using the bundle adjustment method.

In the above-mentioned method, verifying the completion effectiveness, which includes:

Constructing a mathematical model based on the connectivity relationships of the point cloud to extract its texture framework structure.

Extracting the skeleton structure of the input image and comparing it with the framework structure of the completed point cloud.

Assessing the local alignment accuracy by calculating the similarity index under the conditions of the same azimuth and normalized scale.

Considering the completion of the point cloud structure as accurate if the proportion of incorrectly completed point cloud structures is below 5% of the overall structure.

A device used for implementing the method, comprising:

A first module for obtaining 360-degree panoramic data of the building and preprocessing it to obtain a sequence of multi-view images.

A second module for matching and reconstructing the sequence of multi-view images to generate three-dimensional sparse point clouds.

A third module for segmenting the three-dimensional sparse point cloud and using an encoding-decoding neural network to assess the missing data in each segment, completing the missing data for each segment based on the assessment results, and reconstructing the three-dimensional model.

A storage medium stores an executable program that can process any of the foregoing methods when the executable program is executed.

DETAILED DESCRIPTION

Figure 1:
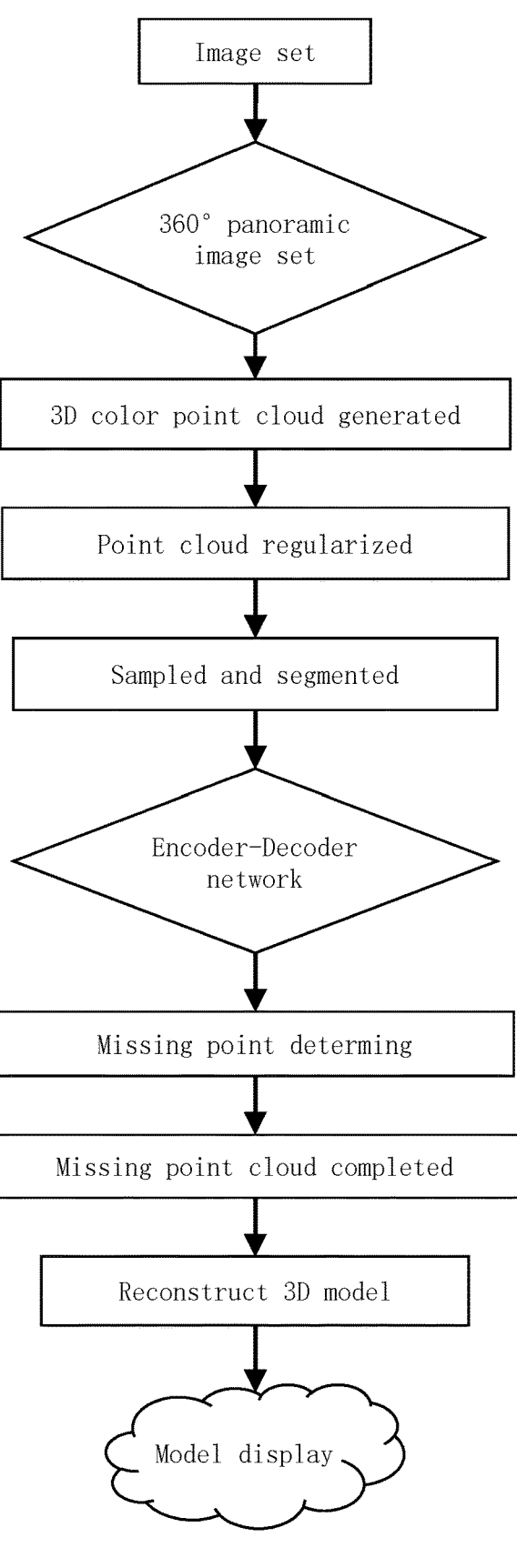
FIG. 1: Flowchart illustrating the process of reconstructing a three-dimensional model of a building based on missing point cloud data in the present invention.
Figure 2:
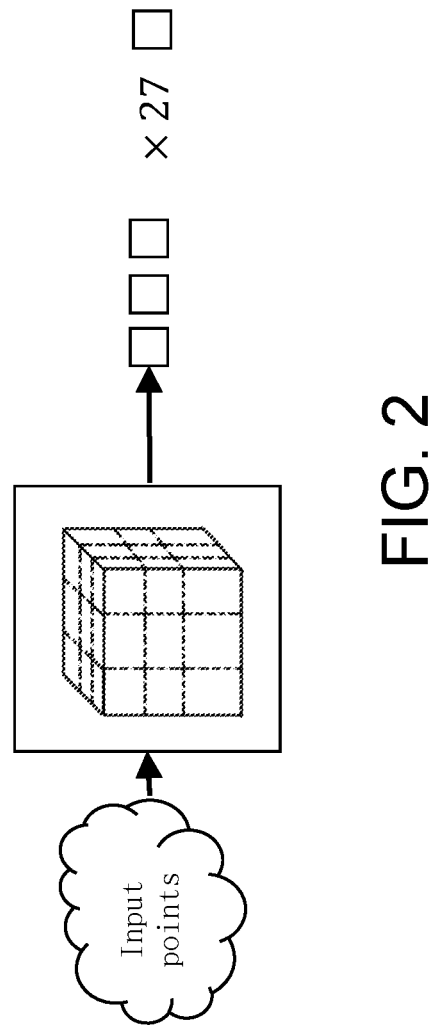
FIG. 2: Schematic diagram illustrating point cloud segmentation in the present invention.
Figure 3:
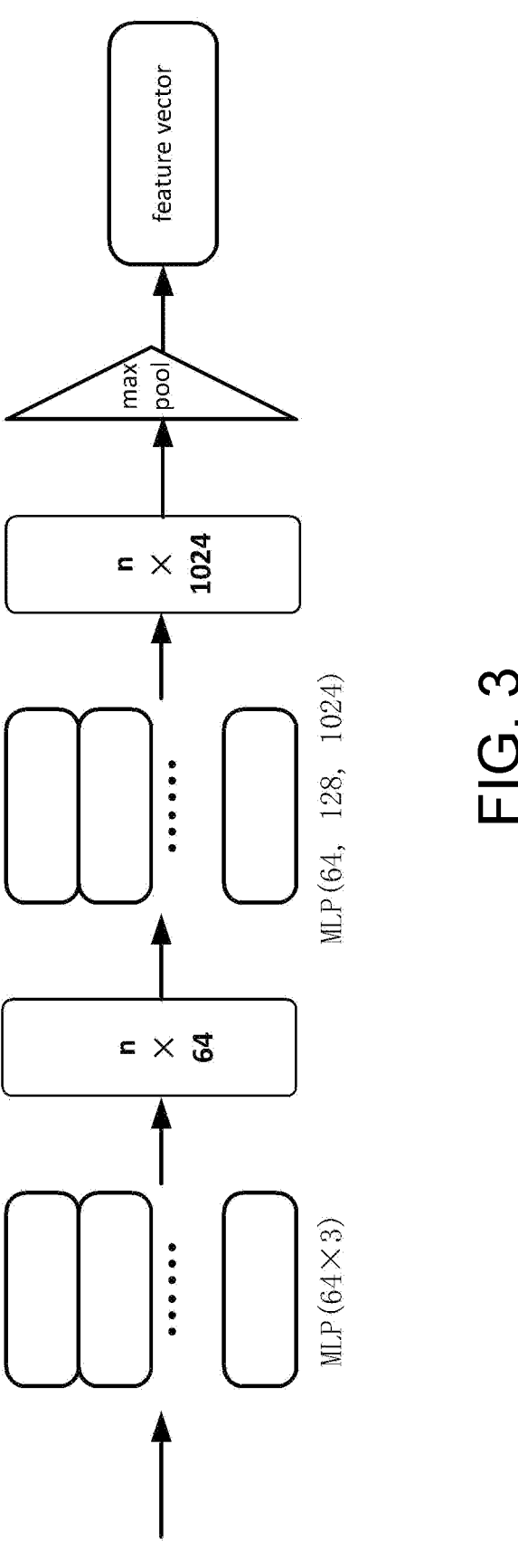
FIG. 3: Flowchart illustrating the process of extracting feature vectors based on the PointNet network in the present invention.
Figure 4:
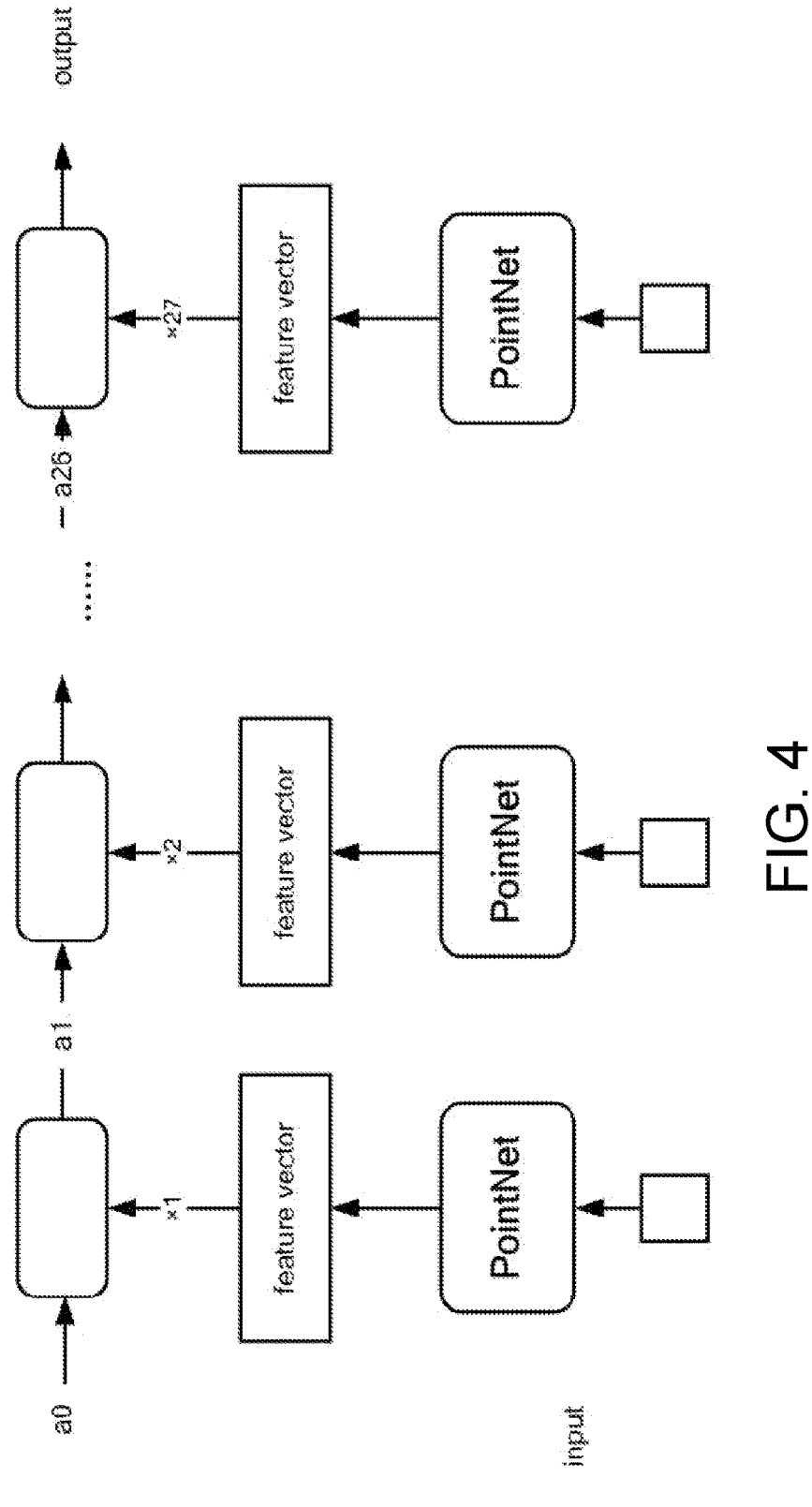
FIG. 4: Flowchart illustrating the process of using the BuildNet network to assess the missing points in the point cloud in the present invention.
Figure 5:
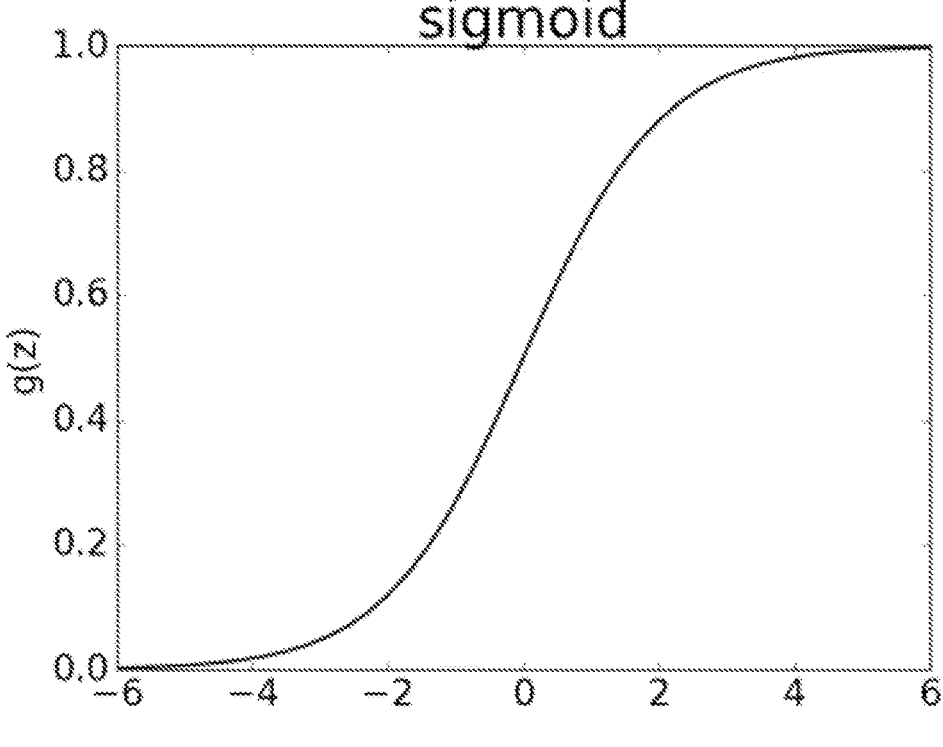
FIG. 5: Illustration of the Sigmoid function utilized in the neural network construction in the present invention.

The method includes the following steps:

Step 1: Autonomous User Upload of 360-Degree Panoramic Data:

Users autonomously upload panoramic data of the building's surroundings in 360 degrees, which may consist of either panoramic images or video content. The uploaded data is processed on the client side. It is essential that users capture panoramic data based on the actual conditions of the building, ensuring a solid foundation for subsequent construction of the three-dimensional model of the house.

Step 2: Generation of Three-Dimensional Point Cloud for the Building Based on User-Provided 360-Degree Panoramic Data:

2.1 Utilizing Image or Extracted Frame Data from Video:

Sequential panoramic image sets are established using image or video data, and 360-degree panoramic images are rectified through multi-view projection. The specific method employs an equal-rectangular projection spherical panoramic model. The original 360-degree panoramic images are transformed into three-dimensional panoramic sphere space using the primary relationship as follows:

$$\begin{cases} x^q_{pano} = w \cdot \theta_q/2\pi + \left(w/2 - 1\right) \\ y^q_{pano} = \left(h/2 - 1\right) - h \cdot \phi_q/\pi \end{cases}, \left(-\pi < \theta \le \pi, -\pi/2 < \phi \le \pi/2\right)$$

$$\begin{cases} \theta_q = \left(2\pi \cdot x^q_{pano} + 2\pi\right)/w - \pi \\ \phi_q = \pi/2 - \left(\pi - 2\pi \cdot y^q_{pano}\right)/2h \end{cases}, \left(0 \le x^q_{pano} < w, 0 \le y^q_{pano} < h\right)$$

Where $x_{pano}$ represents the coordinates of the image points in the original panoramic image, $y_{pano}$ is the corresponding point in the three-dimensional panoramic sphere, w is the length, h is the width of the original panoramic image, and $\theta$ and $\phi$ represent the horizontal and vertical rotation angles between the spherical space azimuth and the image capture azimuth.

2.2 Subsequently, a square with a side length equal to the diameter of the panoramic sphere envelops it. This maps points on the spherical surface to the corresponding cube surface, yielding 6 multi-view images. The cube is then rotated by 45°, remapping the points on the sphere surface to the corresponding cube surface, resulting in another set of 6 multi-view images.

2.3 Finally, from the total 12 multi-view images, a sequence of multi-view images is selected, comprising no less than 6 images in the horizontal direction and no fewer than 2 images in the vertical direction. The sequence undergoes matching and Structure-from-Motion (SFM) reconstruction. The process involves the extraction of SIFT features from the multi-view images, matching using support line projection and affine-invariant constraints, generating a set of matched points, and performing SFM for aerial triangulation and sparse point cloud generation. The camera poses for each frame of the panoramic image are recovered, resulting in the creation of a sparse three-dimensional point cloud for the building.

Step 3: Construction of a Deep Learning Network to Assess Point Cloud Data Missingness:

3.1 Initial Smoothing Operation through Surface Fitting: The point cloud undergoes a smoothing operation via surface fitting, facilitating model reduction or completion to minimize deformation.

3.2 Uniform Sampling and Grid Partitioning of Input Point Cloud: The input point cloud is uniformly sampled, and a 3×3×3 grid structure is applied to partition the point cloud dataset.

3.3 Encoder Construction: An encoder is constructed where processing units receive input in the order of point cloud blocks to maintain the correlation between adjacent point clouds. Each unit utilizes the PointNet network to initially process the input point cloud, extracting local feature vectors.

3.4 Decoder Construction: Vectors obtained from each point cloud block are concatenated, forming a two-layer network. This network operates on the 1024×27 feature matrix generated by the decoder. Following average pooling and Sigmoid activation functions, the network calculates whether the point cloud block exhibits missing data.

$$\text{Sigmoid: } g(z) = \frac{1}{1 + e^z}$$

3.5 Loss Function Calculation: Cross-entropy is employed to compare predicted results with actual results, calculating the loss value. The gradient descent method is then utilized for backpropagation, adjusting parameter values to achieve optimal results.

$$\text{Loss function: } J(w, b) = \frac{1}{m}\sum_{i=1}^{m}\left(-y^{(i)}\log\hat{y}^i - \left(1 - y^{(i)}\right)\log\left(1 - \hat{y}^i\right)\right)$$

Step 4: Utilization of the ShapeNet Dataset for Point Cloud Completion:

Firstly, based on the sampled points from the input image and the 3D model mesh surface, the shape and skeleton of the point cloud plane are predicted. A matching algorithm is employed using the dataset to acquire corresponding viewpoint images for duplication and alignment. This involves mapping each image in the dataset to the input image to obtain the optimal mapped image. Subsequently, a point cloud is reconstructed based on these mapped images. The process specifically employs an encoder aided by an Attention mechanism, focusing on specific torso, branch structures, and detailed parts in the image to obtain features perceived by the Attention mechanism. The encoder maps the image into space and extracts features. Following this, a set of decoders constructed by deconvolutions predicts the point cloud from the image features. Ultimately, a new point cloud plane is obtained. The skeleton structure of this point cloud plane is then compared with the skeleton structure of the input image to ensure the correctness of the results, resulting in a completed point cloud plane.

Step 5: The Integration of a 360-Degree Panoramic View of the House, Floor Plans, and 3D Models into a Unified System for Constructing a Real-World 3D Representation of the House.

Using the vector room floor plan data generated in Step 4, the elevation information for the floor and ceiling of each room is obtained from the point cloud using a height histogram method. The point cloud count in the elevation histogram exhibits two peaks, representing the elevations of the floor and ceiling of the room, respectively.

The Delaunay triangulation method is then employed to triangulate the polygons of the ceiling, walls, and floor for each room, ultimately constructing the final 3D model of the room. The resulting 3D models of the rooms are output in the form of vector Mesh grids.

The coordinates of the photographic center are determined using the bundle adjustment method. The photographic center is projected onto the horizontal plane, and labels are set at the projected point positions. The panoramic view of the house, floor plans, and 3D models are unified to the same coordinates by using the photographic center point and the corresponding label positions as references.

The undisclosed aspects in this specification are understood to belong to the existing technology.

The present invention yields the following positive effects:

1. Enhanced Maneuverability and Efficiency: The invention provides a more mobile, faster, and flexible method for handling missing point cloud data. This method performs well in the process of reconstructing three-dimensional models of buildings from panoramic images, exhibiting characteristics of clarity, accuracy, and freedom from noise interference.

2. Preservation of Complete Structure: The output of point cloud completion retains the complete structure observed in the input point cloud. It can infer the complete point cloud shape of objects from partially observed point cloud data.

3. Convenient Data Collection and Processing: The invention employs a user-friendly process involving the autonomous collection and upload of data by the public. After terminal processing, the data conveniently returns as a three-dimensional model. The operation is simple and easily adaptable for widespread use.

The invention is grounded in the field of real-world three-dimensional reconstruction, presenting an improved method for handling missing point cloud data. It finds extensive applications in various visual task scenarios, including autonomous driving, three-dimensional reconstruction, indoor navigation, augmented reality (AR), robotics, and more. The use of three-dimensional structures generated from two-dimensional images often results in sparse, biased, and incomplete point cloud data due to resolution limitations and occlusion by unrelated objects. By employing computer technology to assess and complete missing point cloud data, one can obtain a logically complete point cloud, facilitating subsequent tasks such as classification and segmentation.

It should be understood that the specific embodiments described in this document are merely illustrative examples of the spirit of the present invention. Those skilled in the art in the technical field to which the present invention belongs can make various modifications, additions, or substitutions to the described embodiments in a similar manner. However, such modifications, additions, or substitutions should not deviate from the spirit of the present invention or exceed the scope defined by the appended claims.

What is claimed is:

1. A method for three-dimensional reconstruction of buildings based on missing point cloud data, comprising the following steps:

S1.1. acquiring 360-degree panoramic data of the building and preprocessing it to obtain a sequence of multi-view images;

S1.2. matching and reconstructing the sequence of multi-view images to generate a three-dimensional sparse point cloud;

S1.3. segmenting the three-dimensional sparse point cloud, applying an encoding-decoding neural network to assess the point cloud's missing data in each segment, and completing the missing point cloud for each segment based on the assessment results to reconstruct the three-dimensional model;

S5.1. employing an equal-rectangular projection spherical panorama model during the multi-view projection correction of the 360-degree panoramic images; and S5.2. converting the original input 360-degree panoramic images to three-dimensional panoramic spherical space, with the formula:

$$\begin{cases} x^q_{pano} = w \cdot \theta_q/2\pi + (w/2 - 1) \\ y^q_{pano} = (h/2 - 1) - h \cdot \phi_q/\pi \end{cases}, (-\pi < \theta \le \pi, -\pi/2 < \phi \le \pi/2)$$

$$\begin{cases} \theta_q = (2\pi \cdot x^q_{pano} + 2\pi)/w - \pi \\ \phi_q = \pi/2 - (\pi - 2\pi \cdot y^q_{pano})/2h \end{cases}, (0 \le x^q_{pano} < w, 0 \le y^q_{pano} < h)$$

wherein $x_{pano}$ represents the coordinates of the image points in the original panoramic image, $y_{pano}$ is the corresponding point in the three-dimensional panoramic sphere, w is the length, h is the width of the original panoramic image, and θ and φ represent the horizontal and vertical rotation angles between the spherical space azimuth and the image capture azimuth.

2. The method for three-dimensional reconstruction of buildings based on missing point cloud data according to claim 1, further comprising:

S2.1. acquiring 360-degree panoramic data of the building and creating a sequence of 360-degree panoramic image sets;

S2.2. performing multi-view projection correction on the sequence of 360-degree panoramic image sets to obtain corrected multi-view images;

S2.3. conducting dense matching and Structure from Motion (SFM) reconstruction on the corrected sequence of multi-view images to generate a three-dimensional sparse point cloud; and S2.4. utilizing PatchMatch Stereo (PMVS) to generate a dense three-dimensional point cloud, smoothing the point cloud, and employing a region growing algorithm for uniform sampling and segmentation, resulting in a partitioned dense three-dimensional point cloud.

3. The method for three-dimensional reconstruction of buildings based on missing point cloud data according to claim 2, wherein the SFM reconstruction to generate three-dimensional sparse point clouds further includes:

selecting not less than 6 images in the horizontal direction and not less than 2 images in the vertical direction to form a sequence of multi-view images for the building;

constructing a Gaussian feature pyramid using the sequence of multi-view images for the building and extracting feature points using the SIFT feature operator;

employing image matching with support line projection and affine-invariant constraints to obtain a set of image matching points; and recovering the camera poses for panoramic images and reconstructing three-dimensional sparse point clouds using multi-view images.

4. The method for three-dimensional reconstruction of buildings based on missing point cloud data according to claim 1, further comprising:

S3.1. utilizing the bundle adjustment method to solve for the coordinates of the photographic center and projecting the photographic center onto the horizontal plane, setting labels at the projected point positions; and S3.2. using the photographic center point and corresponding label positions as references to unify the house panoramic view, floor plan, and three-dimensional model in the same coordinate system.

5. The method for three-dimensional reconstruction of buildings based on missing point cloud data according to claim 1, further comprising:

S4.1. the 360-degree panoramic data of the building is obtained through user uploads or mobile phone capture, and the building's panoramic data includes panoramic images or video streams.

6. The method for three-dimensional reconstruction of buildings based on missing point cloud data according to claim 5, wherein, the constructing the final room three-dimensional model and unifying the house panoramic view, floor plan, and three-dimensional model in the same coordinate system includes:

obtaining elevation information for the floor and ceiling of each room;

identifying the elevation values corresponding to the floor and ceiling by analyzing the histogram of point cloud numbers;

triangulating polygons for the ceiling, walls, and floor of each room using the Delaunay triangulation method;

constructing the final room three-dimensional model and outputting it in vector mesh grid form; and unifying the house panoramic view, floor plan, and three-dimensional model in the same coordinate system using the bundle adjustment method.

7. The method according to claim 1, wherein the encoding-decoding neural network is based on the BuildNet neural network, wherein the encoder extracts point cloud feature vectors from segmented sequence point clouds, wherein each unit of the encoder uses the PointNet network for initial processing to extract local feature vectors, wherein the decoder assesses point cloud missing data taking the extracted feature vector as input, performing average pooling and Sigmoid activation on the decoded 1024*27 feature matrix, outputting the missing data judgment of the point cloud block, and updating weights through backward propagation using the loss function:

$$\text{Sigmoid: } g(z) = \frac{1}{1 + e^z}$$

$$\text{Loss function: } J(w, b) = \frac{1}{m}\sum_{i=1}^{m}\left(-y^{(i)}\log\hat{y}^i - \left(1 - y^{(i)}\right)\log\left(1 - \hat{y}^i\right)\right).$$

8. The method for three-dimensional reconstruction of buildings based on missing point cloud data according to claim 1, further comprising:

ensuring the continuity of point cloud blocks during feature extraction by uniformly sampling input point clouds and gridifying point cloud sets into 3*3*3 blocks; and sequentially inputting the block point clouds into the encoder structure to ensure overall connectivity between the input point cloud block of the previous unit and the input point cloud block of the next unit.

9. A device for three-dimensional reconstruction of buildings based on missing point cloud data, comprising:

a first module configured to obtain 360-degree panoramic data of the building and preprocessing it to obtain a sequence of multi-view images, and the first module further configured to:

employ an equal-rectangular projection spherical panorama model during the multi-view projection correction of the 360-degree panoramic images; and convert the original input 360-degree panoramic images to three-dimensional panoramic spherical space, with the formula:

$$\begin{cases} x^q_{pano} = w \cdot \theta_q / 2\pi + (w/2 - 1) \\ y^q_{pano} = (h/2 - 1) - h \cdot \phi_q / \pi \end{cases}, (-\pi < \theta \le \pi, -\pi/2 < \phi \le \pi/2)$$

wherein $x_{pano}$ represents the coordinates of the image points in the original panoramic image, $y_{pano}$ is the corresponding point in the three-dimensional panoramic sphere, w is the length, h is the width of the original panoramic image, and $\theta$ and $\varphi$ represent the horizontal and vertical rotation angles between the spherical space azimuth and the image capture azimuth;

a second module configured to match and reconstruct the sequence of multi-view images to generate three-dimensional sparse point clouds; and a third module configured to segment the three-dimensional sparse point cloud and using an encoding-decoding neural network to assess the missing data in each segment, completing the missing data for each segment based on the assessment results, and reconstructing the three-dimensional model.

10. A non-transitory storage medium storing executable instructions, wherein the storage medium implements the method for three-dimensional reconstruction of buildings based on missing point cloud data according to claim 1 when being executed by a processor.

11. A non-transitory storage medium storing executable instructions, wherein the storage medium implements the method for three-dimensional reconstruction of buildings based on missing point cloud data according to claim 2 when being executed by a processor.

12. A non-transitory storage medium storing executable instructions, wherein the storage medium implements the method for three-dimensional reconstruction of buildings based on missing point cloud data according to claim 4 when being executed by a processor.

13. A non-transitory storage medium storing executable instructions, wherein the storage medium implements the method for three-dimensional reconstruction of buildings based on missing point cloud data according to claim 5 when being executed by a processor.

14. A non-transitory storage medium storing executable instructions, wherein the storage medium implements the method for three-dimensional reconstruction of buildings based on missing point cloud data according to claim 3 when being executed by a processor.

15. A non-transitory storage medium storing executable instructions, wherein the storage medium implements the method for three-dimensional reconstruction of buildings based on missing point cloud data according to claim 7 when being executed by a processor.

16. A non-transitory storage medium storing executable instructions, wherein the storage medium implements the method for three-dimensional reconstruction of buildings based on missing point cloud data according to claim 6 when being executed by a processor.

17. A non-transitory storage medium storing executable instructions, wherein the storage medium implements the method for three-dimensional reconstruction of buildings based on missing point cloud data according to claim 8 when being executed by a processor.

* * * * *